Nov. 28, 1939.　　　W. L. POLLARD　　　2,181,380
VARIABLE SPEED TRANSMISSION
Filed March 30, 1936　　　4 Sheets-Sheet 1
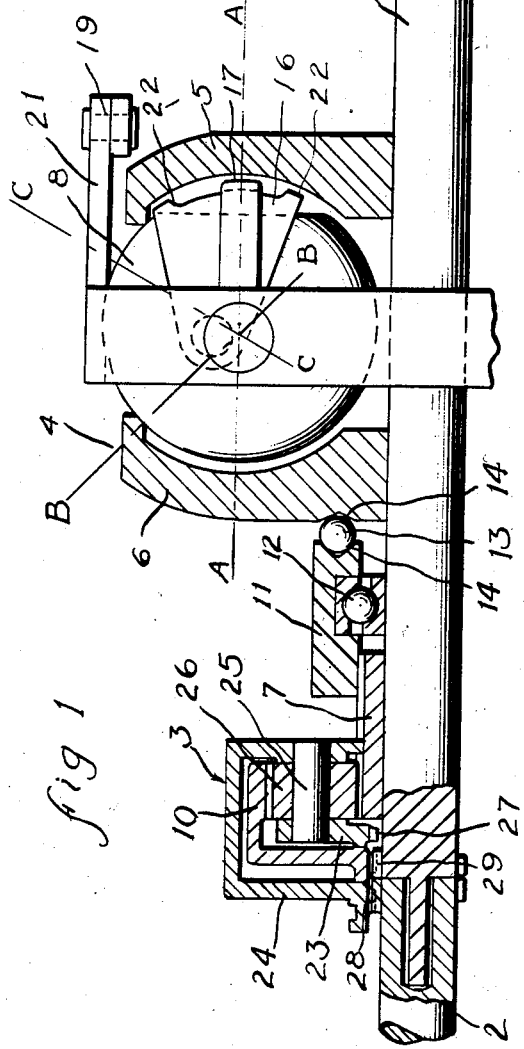
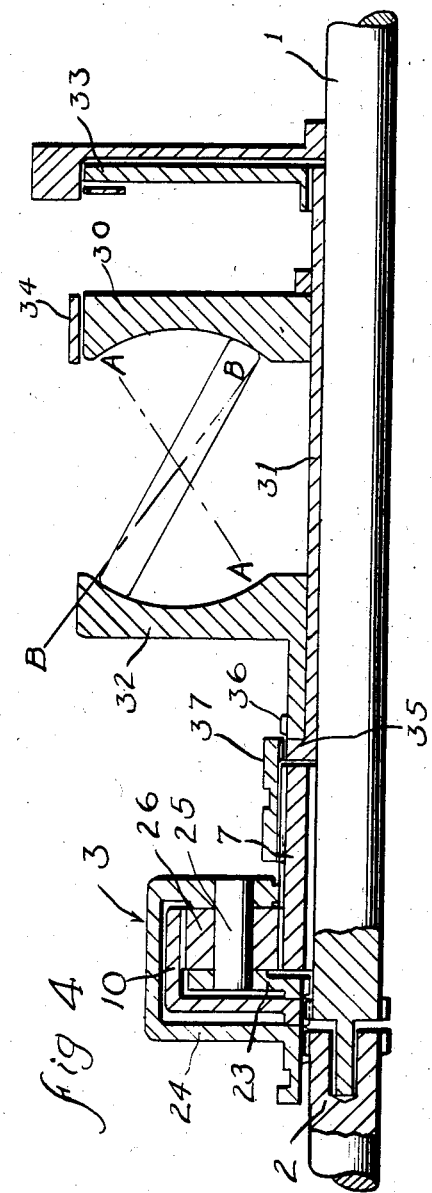
Inventor
Willard L. Pollard Nov. 28, 1939.  W. L. POLLARD  2,181,380
VARIABLE SPEED TRANSMISSION
Filed March 30, 1936   4 Sheets-Sheet 2
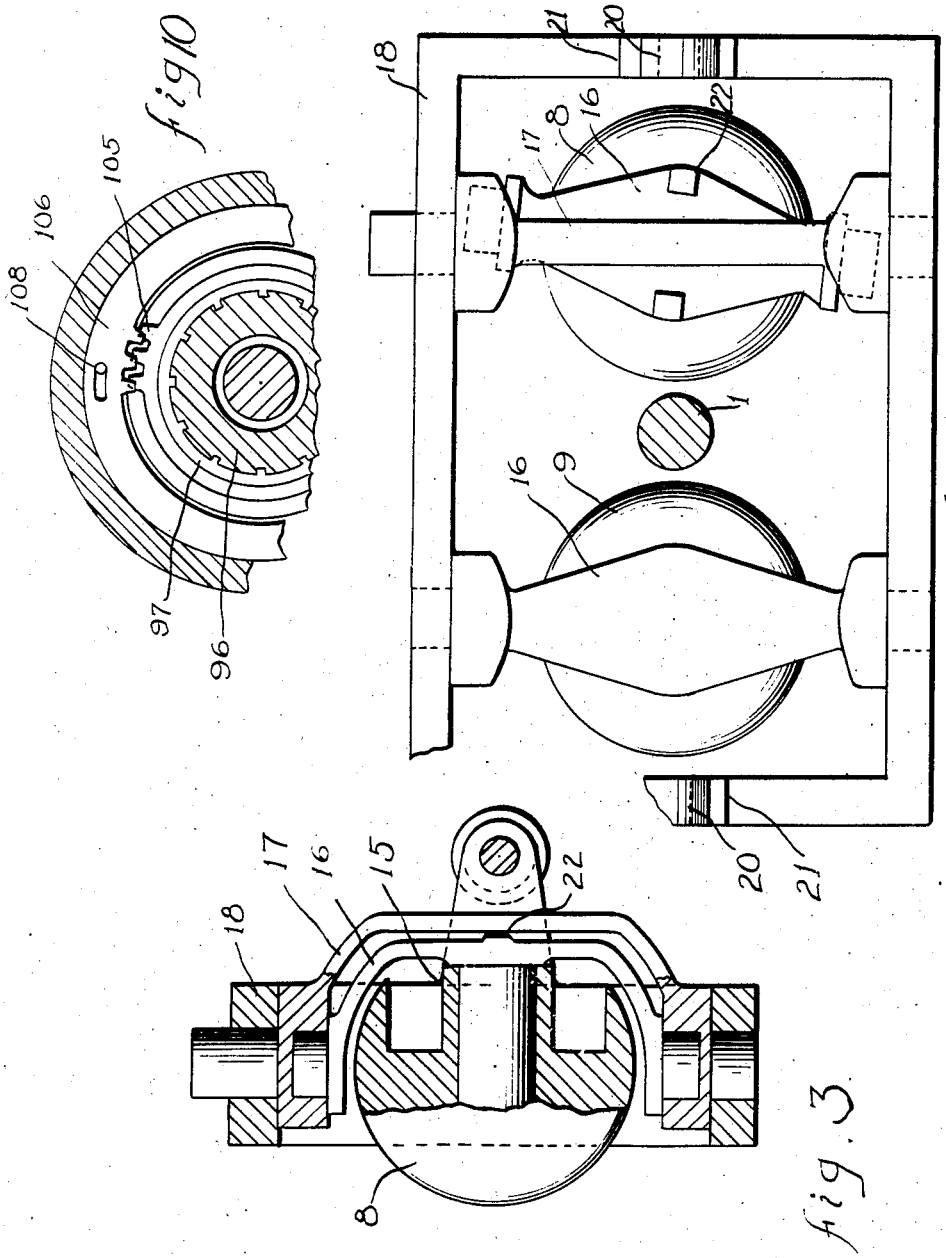

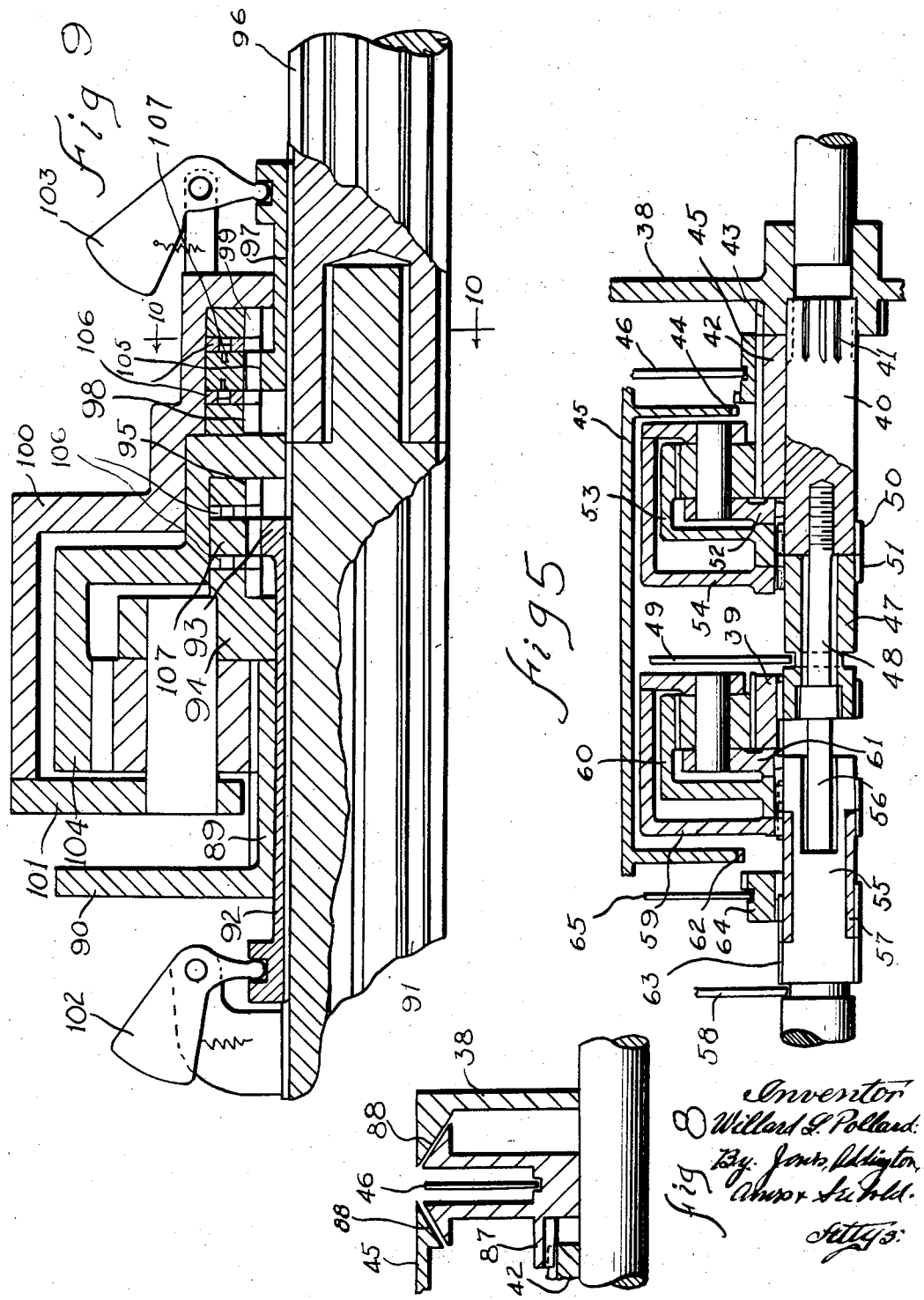

Patented Nov. 28, 1939

2,181,380

UNITED STATES PATENT OFFICE 2,181,380

VARIABLE SPEED TRANSMISSION

Willard L. Pollard, Evanston, Ill.

Application March 30, 1936, Serial No. 71,608

15 Claims. (Cl. 74—285)

My invention relates to variable speed transmissions suitable for use in automobile propulsion.

One of the objects of my invention is to provide an improved transmission, by means of which a comparatively large number of speed ratios may be easily obtained.

A further object is to provide such a construction which will be rugged and compact and relatively inexpensive to manufacture and assemble.

A further object is to provide improved control means for such a transmission.

A further object is to provide improved means for effecting the shifting of a spheroidal idler friction transmission.

A further object is to provide improved means for effecting self equalization between the idlers of a spheroidal idler friction transmission.

Further objects and advantages of the invention will be apparent from the description and claims.

In the drawings, in which several embodiments of my invention are shown,

Figure 1 is an axial sectional view of a friction planetary transmission;

Fig. 2 is an elevational sectional view of the idler carrying rocker frame, viewed from the right in Fig. 1;

Fig. 3 is a section substantially on the line A—A of Fig. 1;

Fig. 4 is an axial sectional view, showing another form;

Fig. 5 is an axial sectional view showing still another form;

Fig. 8 is an axial sectional view showing a friction clutch construction, which may be used in place of the dog clutch construction shown in Fig. 5;

Fig. 9 is an axial sectional view showing another form of my invention; and

Fig. 10 is a section substantially on the line 10—10 of Fig. 9.

Figure 7:
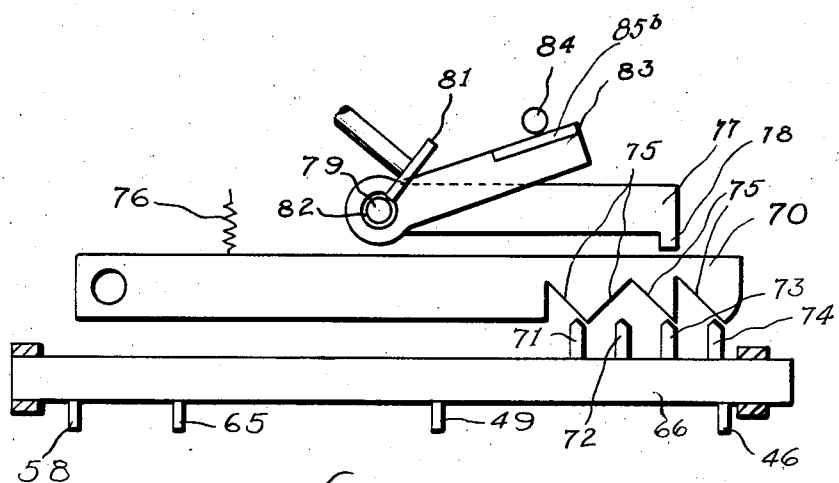
Fig. 7 is a section substantially on the line 7—7 of Fig. 6.
Figure 6:
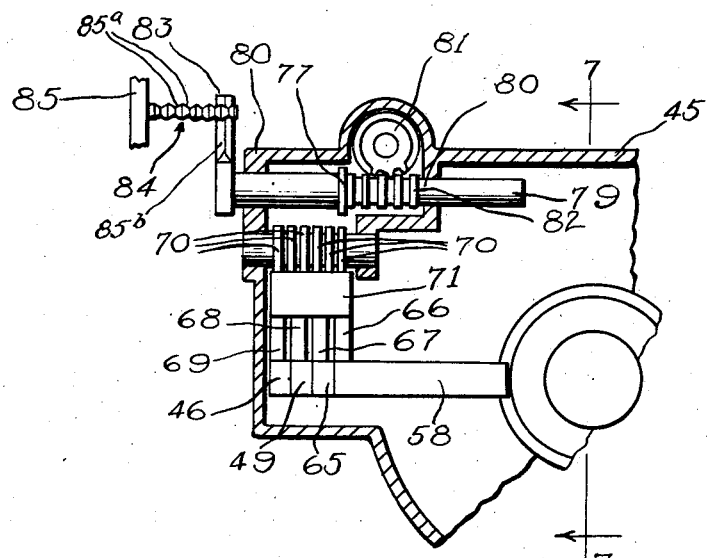
Fig. 6 is a transverse vertical sectional view showing a control mechanism for the transmission of Fig. 5.

Referring to the drawings in detail, and first to Figs. 1, 2, and 3, the construction shown therein comprises a driving shaft 1, which may be driven from the motor of an automobile, a driven shaft 2, which may drive the propeller shaft of an automobile, and a three-element planetary gear 3, one element of which may be connected to drive the driven shaft, another element of which may be connected to be driven by the driving shaft, and a third element of which may be controlled by a variable speed friction transmission 4. The variable speed transmission shown is of the spheroidal idler type and comprises a driving wheel 5 secured to the driving shaft 1, a driven wheel 6 for controlling the motion of the sun gear 7 of the planetary gear construction, and a pair of spheroidal idlers 8 and 9 engaging both the driving wheel 5 and the driven wheel 6 and shiftable to different positions to control the speed of the driven wheel with respect to the driving wheel.

The planetary gear assembly 3 is shiftable bodily axially from one position to another. In the forward position of the planetary assembly, the driven shaft 2 is connected with the cage of the planetary, and the ring gear 10 is connected with the driving shaft 1. In the rear position of the planetary, the ring gear 10 is connected to the driven shaft 2, and the cage is connected to the driving shaft 1. The motion of the sun gear 7 is controlled by the driven friction wheel by a load-controlled pressure device comprising a sleeve 11 having a radial and thrust anti-friction bearing connection 12 with the driving shaft 1, the rear end of this sleeve 11 being splined to the sun gear 7 of the planetary and the front end of the sleeve having any usual or suitable type of load controlled pressure connection with the driven friction wheel, the construction shown comprising a plurality of hardened balls 13 seated in conical depressions 14 in the sleeve 11 and driven friction wheel 6, respectively.

The spheroidal idler construction is provided with means whereby the shifting of the idlers may be effected easily and whereby the shifting of one idler will automatically cause the shifting of the other idler. The easy shifting for the idler 8 is effected by mounting this idler on a stub shaft 15 secured to a yoke 16 mounted for swinging movement in a control yoke 17, which control yoke is mounted for swinging movement in a rectangular frame 18, which rectangular frame 18 is itself mounted for swinging movement about a pair of pivot pins 19 extending through openings 20 in the frame arms 21, this latter swinging movement being provided to effect the automatic equalization between the idlers 8 and 9. The axis of the control yoke 17 lies in a plane perpendicular to the driving shaft 1. The axis of the idler-carrying yoke 16 is inclined with respect to the axis of the control yoke 17 (Fig. 2). The movement of the control yoke 17 with respect to the idler-carrying yoke 16 may, if desired, be limited by providing a pair of lugs 22 on the idler-carrying yoke 16, between which lugs 22 the control yoke may operate. This limitation of the movement of the control yoke 17 relative to the idler-carrying yoke 16 may be desirable in order to limit the rate at which the speed ratio is changed.

It has been found by experiment, and it may be shown mathematically, that if the idler 8 is held by its yoke in a position in which the paths of the friction wheels 5 and 6 on the idler are helicoidal, the idler will automatically be swung with its yoke toward a position in which the paths of the friction wheels on the spheroidal idler will be circular. This condition exists when the axis of the idler-carrying shaft 15 either intersects or is parallel to the axis of the driving shaft 1. It will be seen that a movement of the control yoke 17, relative to the idler-carrying yoke 16, will cause a shifting of the axis of the idler-carrying shaft 15, thus disturbing its position of equilibrium and causing the friction wheels 5 and 6 to describe helicoidal paths on the spheroidal idler until the spheroidal idler has shifted to another position of equilibrium, in which the friction wheels are again describing circular paths on the spheroidal idler. Thus, by shifting the control yoke, the idler will, in effect, be caused to shift itself into a new position, changing the speed ratio of the driven friction wheel with respect to the driving friction wheel.

Only one of the idlers is provided with a control yoke as the movement of the controlled idler controls the movement of the other idler. This equalization between the idlers is effected by the pivotal mounting 19 of the rectangular yoke-carrying frame. It has been found by experiment, and may be shown mathematically, that when the equilibrium of the controlled idler is disturbed, causing it to move to another position, it will cause a swinging movement of the rectangular idler-carrying frame about its pivotal axis, which will cause the equilibrium of the other idler to be disturbed, causing the friction wheels 5 and 6 to describe helicoidal paths on this idler also and causing it to shift to a new position of equilibrium which will correspond to the new position of equilibrium of the control idler. Thus a comparatively slight force exerted on the control yoke may be used to cause both idlers in effect to shift themselves to the desired new position.

It will be seen that by the use of the spheroidal idler, the speed ratio of the driven friction wheel with respect to the driving friction wheel, may be changed by infinitesimal gradations over a wide range. When the axis of the spheroidal idler lies in the plane A—A of Fig. 1, the driven friction wheel 6 will be rotating in the same direction and at the same speed as the driving friction wheel 5. When the axis of the idler is in the plane B—B of Fig. 1, the driven friction wheel will be standing still, regardless of the speed of the driving friction wheel. When the axis of the idler shaft lies in the plane C—C of Fig. 1, the driven friction wheel will be rotating about three times as fast as the driving friction wheel, but in a reverse direction. Thus, the range of the speed ratio is from direct 1:1 to reverse 3:1. With the pitch diameters of a well known make of planetary transmission, this range of speed ratios of the friction members can be used to change by infinitesimal gradations the speed of the driven shaft 2 from a ratio of direct 1:1 with the driving shaft to a ratio of about 1.3:1 in a reverse direction to that of the driving shaft (when the cage of the planetary is secured to the driving shaft).

In order to provide for an overdrive after the driven shaft 2 has been brought into synchronism with the driving shaft 1, the planetary assembly 3 is shifted to its rearmost position in which the cage is secured to the driving shaft and the ring gear is secured to the driven shaft and the friction transmission is then controlled in such manner as to gradually bring the driven friction wheel 6 to a standstill, in which position the driven shaft 2 will have an overdrive with respect to the driving shaft 1 of about 1.4:1. This overdrive may of course be still further increased if desired by controlling the friction transmission in such a manner as to cause a reverse rotation of the driven friction wheel with respect to the driving friction wheel.

Referring further to the sliding shift of the planetary assembly, it will be noted that the cage comprises two parts, 23 and 24, secured together by the pins 25 on which the planet gears 26 are mounted, and that each of these parts of the cage is provided with dog clutch members 27 and 28, respectively, for cooperation with corresponding dog clutch members on the driving and driven shaft, respectively. The ring gear 10 is also provided with dog clutch teeth 29 for cooperation with the dog clutches on the driving and driven shafts, respectively. When, as shown, the planetary assembly is in its forward position, the dog clutch 28 on the rear member of the cage is in engagement with the driven shaft 2, and the dog clutch 29 on the ring gear is in engagement with the driving shaft 1. When the planetary assembly is shifted to its rear position, the dog clutch 28 on the rear part of the cage is out of engagement with the driven shaft; the dog clutch 29 on the ring gear is in engagement with the driven shaft 2, and the dog clutch 27 on the front part 23 of the cage is in engagement with the driving shaft 1. In this shifting movement, the sun gear 7 slides axially in the sleeve 11, this movement being permitted because of the splined connection between the pinion and sleeve.

In Fig. 4 is shown another form of transmission, using substantially the same planetary assembly 3 and planetary shift. In this construction, a friction transmission of the well-known torroid type is used, the front torroidal wheel 30 being fixed on a sleeve 31 rotatably mounted on a driving shaft 1, and the rear torroidal wheel 32 being rotatably mounted and held against endwise movement on this sleeve 31. Any suitable load-controlled pressure device (not shown), well known in connection with the torroidal type of transmission, may be used for controlling the pressure. The sleeve 31 may be connected or disconnected with respect to the driving shaft 1 by means of any suitable friction clutch 33. The driving friction wheel 30 and the sleeve 31 on which it is mounted may be held against rotation when desired by disconnecting the clutch 33 and applying a brake 34 to the driving friction wheel 30. The sun gear 7 may be alternatively connected either with the dog clutch 35 on the sleeve 31 or with a dog clutch 36 on the hub of the driven friction wheel 32 by means of a sliding clutch member 37 splined on the sun gear 7 and having dog clutch teeth engageable in one position with the sleeve clutch 35 and in the other position with the wheel clutch 36.

In this transmission, the friction drive is used for obtaining infinitesimal speed ratio adjustments from reverse up to about .6 of direct drive. When the idler is in the position A—A of Fig. 4, the sun gear will be rotating in a reverse direction to that of the driving shaft at a ratio of about 3:1 and this will give a reverse rotation of the planetary cage at a speed of about .3:1 in reverse. When the idler is in the position B—B, the driven friction wheel will be rotating in reverse at a comparatively low rate and the cage will be rotating in a forward direction at about a speed of .6:1 with respect to the driving shaft. In order to get from this speed into direct drive, the clutch 33 is disconnected, the brake 34 is applied, the dog clutch 37, which has been in its forward position up to now, is shifted to its rear position, in which it engages the sleeve 35, the brake 34 is released and the clutch 33 is again applied and the drive is then a direct 1:1 drive. In order to get into overdrive, the planetary assembly 3 is shifted to its rear position, in which the ring gear 10 is connected with the driven shaft 2 and the cage is connected with a driving shaft 1, the clutch 33 is released and the brake 34 is again applied. This gives an overdrive, since, when the sun gear is held and the cage is rotating with the driving shaft, the ring gear will be rotated in the same direction as the cage but at a higher speed.

In Fig. 5 is shown another form of my invention involving the use of two planetary gear constructions in series. The front planetary may be used to give an underdrive, an overdrive and a direct drive to the driven clutch plate 38. The left-hand rear planetary may be used to give the propeller shaft a direct drive with respect to its sun gear, an underdrive and a reverse. By suitable combinations of the two planetaries, six forward speeds and three reverse speeds may be obtained if desired.

The extension shaft 40 on which the sun gear of the right-hand front planetary is rotatably mounted may have a splined connection 41 with the driven plate 38 of the usual friction clutch. The sun gear 42 of this front planetary may be alternatively connected, either with a dog clutch member 43 on the clutch plate 38 or with a stationary dog clutch member 44 on the gear case 45 by means of a sliding dog clutch 45 splined on the sun gear 42 and shiftable by means of a shifting arm 46 into forward position for connection with the clutch plate or into rearward position to connect with the stationary clutch 44 or into a neutral position, in which it is disconnected both from the clutch plate and from the stationary clutch.

The shaft extension 40, which is splined and slidably movable with respect to the clutch plate 38, carries a hollow extension shaft 47, this hollow shaft 47 being secured to the splined shaft 40 by means of a shouldered pin 48 threaded into the splined shaft 40, the tubular shaft 47 being rotatably mounted on the shouldered pin. The assembly of these two short shafts may be shifted axially by means of a shifter arm 49. These two short shafts 40 and 47 are provided with dog clutch formations 50 and 51, respectively, for cooperation with corresponding dog clutch formations on the two-part cage and on the ring gear. In the forward position of this shaft assembly, the front shaft 40 has a dog clutch connection with the front part 52 of the cage of the planetary and the rear shaft 47 has a dog clutch connection with the ring gear 53. In the rear position of this shaft assembly, the tubular shaft 47 has a dog clutch connection with the rear part 54 of the cage and the front splined shaft 40 has a dog clutch connection with the ring gear 53.

For the underdrive, the front dog clutch 45 is operated to hold the sun gear 42 stationary and the shifter arm 49 for shifting the shaft assembly is shifted to its rear position so that the tubular shaft 47 is connected with the cage and the ring gear 53 is connected with the spline shaft 40. In this position, when the clutch is thrown in to rotate the driven clutch plate 38, the cage and consequently the tubular shaft 47 will be rotated in the same direction as the driven clutch plate 38 but at a lower speed. For direct drive, the front dog clutch 45 is shifted to cause the sun gear 42 to rotate with the driven clutch plate 38, in which position the entire planetary assembly, the splined shaft 40, and the tubular shaft 47 rotate as a unit. For overdrive, the shaft assembly is shifted to forward position to connect the tubular shaft 47 to the ring gear 53 and to connect the splined shaft 40 with the cage and the dog clutch member 45 is shifted back to hold the sun gear 42 against rotation. In this position of parts, the ring gear 53 and the tubular shaft 47 are rotated in the same direction as the driven clutch plate 38 but at a higher rate of speed.

As previously indicated, the sun gear 39 of the rear left-hand planetary is splined to the tubular shaft 47. The shaft 55 in which a pin extension 56 of the shouldered pin 48 is piloted drives the propeller shaft. This rear shaft 55 has rotatably mounted thereon a control sleeve 57. This rear shaft 55, with the control sleeve 57, may be shifted axially by a shifter arm 58. In the rear position of this shaft 55 and sleeve 57, the control sleeve 57 is connected with the rear part 59 of the cage of the rear planetary, and the propeller drive shaft 55 is connected with the ring gear 60. In the forward position of the rear shaft 55 and sleeve 57, the control sleeve 57 has a dog clutch connection with the ring gear 60, and the rear shaft 55 has a dog clutch connection with the front part 61 of the cage. The control sleeve 57 may be alternatively connected either with a fixed dog clutch formation 62 on the gear case or with a dog clutch formation 63 on the rear shaft 55 by means of a dog clutch member 64 splined on the control sleeve 57 and operated by means of a clutch shifting arm 65.

For direct drive between the tubular shaft 47 and the propeller drive shaft 55, the dog clutch member 64 is shifted to its rear position, in which it will connect the control sleeve 57 directly with the rear shaft 55.

For low gear, the shaft 55 and control sleeve 57 are shifted to their forward position, in which the ring gear 60 is connected to the control sleeve 57, and the shaft 55 is connected with the front portion 61 of the cage. The dog clutch member 64 is shifted to its forward position, in which it will engage the fixed dog clutch 62 on the gear casing 45 and thus hold the control sleeve 57 and with it the ring gear 60 against rotation. With this position of parts, the cage and, consequently, the propeller drive shaft 55 will be rotated in the same direction as the sun gear 39 but at a lower rate of speed.

For reverse, the rear shaft 55 and control sleeve 57 are shifted to rear position in which the control sleeve 57 is connected with the rear part 59 of the cage, and the rear propeller drive shaft 55 is connected with the ring gear 60. The dog clutch 64 is in a position in which it holds the control sleeve 57 against rotation and consequently holds the cage against rotation. In this position of parts, the ring gear 60, and with it the propeller drive shaft 55, will be rotated in a direction reverse to that of the sun gear 39 and at a lower rate of speed than the sun gear.

By suitable combinations of positions, it will be seen that the two planetaries in series may be hooked up so as to give any one of six forward speeds and any one of three reverse speeds.

In Figs. 7 and 8 is shown a form of control for the planetaries of Fig. 5. The construction shown for this purpose comprises four slides 66, 67, 68, and 69 on which the clutch-shifting arms 58, 65, 49, and 46 are rigidly mounted, respectively, one slide being provided for each shifting arm, a plurality of slide-shifting levers 70, one for each desired position of the clutch-shifting slides 66, 67, 68, and 69, and a selector for selecting that one of the slide-shifting levers 70 which it is desired to operate. One control lever 70 should be provided for each desired position of the clutch-controlling slides. I have shown but six of these controlling levers, since for passenger cars the present demand does not require more than four forward speeds and one reverse speed, the sixth lever being provided for shifting the dog clutches to neutral disconnected position. Each of the clutch-controlling slides 66, 67, 68, and 69 has rigidly secured thereto an upwardly extending shifter plate or follower 71, 72, 73, and 74, respectively, extending clear across underneath all six of the slide-controlling levers 70. The plate 71 may be connected to the slide 66, the plate 72 to the slide 67, the plate 73 to the slide 68, and the plate 74 to the slide 69. Each of the slide-actuating levers is provided with four slide-controlling cam surfaces 75, one for co-operation with each of the slide-actuating plates 71, 72, 73, and 74. These notches are so formed that when the slide-controlling lever is depressed, it will cause all four of the slides to be in the desired position to give a speed corresponding to this slide-actuating lever. If desired, individual springs 76 may be provided for each of the slide-actuating levers 70 for normally holding them in raised position.

In order to select the lever which it is desired shall be depressed, a selector lever 77 is provided, the actuating finger 78 of which can be shifted transversely above the slide-controlling levers 70 to select the lever which is to be depressed. To enable this transverse movement, the shaft 79 on which this depressor lever is mounted is slidably mounted in bearing openings 80 in the gear casing. The axial shifting of this shaft on which the depressor finger is mounted may be effected by means of a pinion 81 engageable with annular teeth or rings 82 formed on the axially shiftable shaft 79 which will be engageable and operable by the pinion 81, regardless of the rocking movement of the shaft on which the selector lever 77 is mounted.

The depression of the selector lever may be effected by means of an arm 83 rigidly mounted on the shaft 79 and engageable in any position to which it is adjusted by a pin 84 rigidly mounted on the clutch pedal 85 or any suitable operating member. The axial position of the shaft 79 may be controlled by hand or foot, or automatically by any suitable speed or torque control means. If speed or torque control are used, the pin 84 may be provided with a plurality of positioning grooves 85ª—one for each of the actuating levers 70, in order to insure accurate registration of the lever 77 with the selected one of the control levers 70. If the automatic control should happen to bring the shaft 79 into a position not exactly in registry with one of the levers 70, the depression of the clutch pedal 85 will cause a slight shifting of the shaft 79 axially, due to the engagement of the beveled upper edge 85ᵇ of the lever 83 by the sloping surfaces of the grooves in the pin 84.

In Fig. 8 is shown a friction clutch construction which may be substituted for the dog clutch 45 of Fig. 5. This friction clutch construction has a splined connection 87 with the sun gear 42, and may be shifted back and forth by means of the clutch-shifting member 46 from a forward position in which it engages the driven clutch plate 38 to a rearward position in which it engages a friction clutch or brake formation 88 on the gear casing 45. It will be seen that this friction clutch may be used to accomplish the same effects as the dog clutch 45 of Fig. 5.

In Figs. 9 and 10 is shown a construction for obtaining a speed-controlled shift by means of which three forward speeds may be obtained from a simple planetary gearing construction along the general lines of the planetary gearings already described. This construction may be used for obtaining selectively or by means of speed control a direct drive, an underdrive, and an overdrive. In this construction, the sun gear 89 is always held against rotation by means of a non-rotatable flange 90. The driving shaft 91 has splined thereon a speed-controlled dog clutch sleeve 92, the dog clutch 93 of which in its forward position connects with a dog clutch formation 94 on the rear part of the planetary cage, and which dog clutch construction 93 in its rear position connects with a dog clutch formation 95 on the ring gear. The driven shaft 96 also is provided with a speed controlled dog clutch sleeve 97 splined on the driven shaft 96 which in its forward position connects with a dog clutch formation 98 on the ring gear, and which in its rear position engages a dog clutch formation 99 on a drum or sleeve member 100 which is secured to the front portion 101 of the planetary cage. In this construction, in the underdrive the parts are operating at a relatively low speed and both dog clutch sleeves will be in a rear position, since centrifugal force is not then great enough to overcome the spring action tending to hold the clutch controlling weights 102 and 103 inwardly. In this position the driving shaft 91 is connected with the ring gear 104 through the front dog clutch 93, and the driven sleeve 96 is connected to the cage clutch 99 through the rear dog clutch 105. This gives a slower rotation of the driven shaft than of the driving shaft. When the speed of the driving shaft has increased sufficiently to cause the centrifugal weights 102 and 103 to tend to shift the front dog clutch 93 out of clutching engagement with the ring gear and into clutching engagement with the cage clutch 94, the accelerator is released, causing a slowing up of the driving shaft 91 with a decrease of torque exerted by the dog clutch member 93 which enables the dog clutch member to snap forward and engage the dog clutch formation 94 on the rear part of the cage when the motor shaft 91 has slowed down to the speed of the cage which is rotating with the driven shaft 96. This gives a direct 1:1 drive between the driving shaft 91 and driven shaft 96. When the speed has still further increased and the centrifugal action of the rear weight 103 is sufficient to overcome the tension of the spring and is tending to shift the dog clutch sleeve 97 to its forward position, the accelerator is again released to permit the driving shaft 91 to slow up and lessen the torque. The rear dog clutch sleeve 97 then snaps forward, and when the ring gear 104, which has been transmitting no torque but has been traveling at a higher rate of speed than the cage, has slowed down to the speed of the driven shaft 96, the dog clutch formation 104 will snap into engagement with the ring gear clutch 98. With this position of parts, when the motor is again speeded up, the driving shaft 91 will be connected with the cage, the ring gear 104 will be connected with the driven shaft 96 and, since the sun gear is held stationary, the driven shaft will be rotated at a higher speed than the driving shaft.

In order to prevent the dog clutch members 93 and 105 on the sleeves from coming into engagement with the dog clutch members on the ring gear and cage until the parts which are to be connected are rotating in synchronism, a plurality of blocking rings 106 is provided, mounted on annular ring carriers 107. As the construction of these blocking rings and blocking ring carriers is the same for both dog clutch sleeves, only one will be described. The blocking ring carrier is provided with an external gear formation which, in the neutral position of the dog clutch sleeve 97, engages the corresponding dog clutch teeth 105 on the sleeve. Each of the blocking rings 106 (Fig. 10) also has an internal gear formation which, when the parts are in registry, can interfit with the teeth 105 on the dog clutch sleeve 97. Each of these blocking rings has a lost motion pin and slot connection 108 with the ring carrier 107. In the mid-position of the blocking ring 106 with respect to the blocking ring carrier 107, the internal gear teeth on the blocking ring register with the internal gear teeth on the blocking ring carrier. In either extreme position of the blocking ring with respect to the blocking ring carrier, the teeth on the blocking ring are out of registration with the teeth on the blocking ring carrier. With this construction, it will be seen that so long as there is relative rotation of the blocking ring 106 with respect to the member with which it is desired to effect a clutch engagement, the blocking ring will be frictionally moved to one of its extreme positions in which it will block the movement of the slidable dog clutch sleeve 97 from clutching engagement. However, as soon as the direction of rotation of one of the parts which is to be connected is reversed with respect to the other part to be connected, friction will cause a movement of the blocking ring 106 with respect to the blocking ring carrier, and when the blocking ring reaches its mid-position the teeth on the blocking ring will register with the teeth on the ring carrier, and the slidable dog clutch sleeve will then be free to shift.

Further modifications will be apparent to those skilled in the art, and it is desired, therefore, that the invention be limited only by the prior art and the scope of the appended claims.

Having thus described my invention, what I claim and desire to secure by Letters Patent is:

1. A variable speed friction transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, one of said elements being rotatable with the driving shaft, another element being rotatable with the driven shaft, and another element being a control element, and means for selectively causing the control element to rotate in the same direction as the driving shaft or in the opposite direction, the means for causing it to rotate in said opposite direction comprising a variable speed drive having a driving rotor and a driven rotor both coaxial with said shafts, said control element being rotatable with said driven rotor, the means for causing the control element to rotate in the same direction as the driving shaft including releasable gripping means for connecting and disconnecting said control element with respect to said driven rotor and for connecting the control element to rotate with the driving shaft.

2. A variable speed friction transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, one of said elements being rotatable with the driving shaft, another element being rotatable with the driven shaft, and another element being a control element, and means for selectively causing the control element to rotate in the same direction as the driving shaft or in the opposite direction, the means for causing it to rotate in said opposite direction comprising a variable speed drive having a driving rotor and a driven rotor both coaxial with said shafts, said control element being rotatable with said driven rotor and releasable gripping means for connecting and disconnecting said control element with respect to said driven rotor and for holding the control element against rotation.

3. A variable speed friction transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, one of said elements being rotatable with the driving shaft, another element being rotatable with the driven shaft, and another element being a control element, and means for selectively causing the control element to rotate in the same direction as the driving shaft or in the opposite direction, the means for causing it to rotate in said opposite direction comprising a variable speed drive having a driving rotor and a driven rotor both coaxial with said shafts, said control element being rotatable with said driven rotor, the means for causing the control element to rotate in the same direction as the driving shaft including releasable gripping means for connecting and disconnecting said control element with respect to said driven rotor and for connecting the control element to rotate with the driving shaft and releasable gripping means for holding the control element against rotation.

4. A variable speed transmission comprising two coaxial friction wheels, a spheroidal idler engaging said wheels, bearing means on which said idler is rotatably mounted, an oscillatable frame on which said bearing means is mounted, the axis of said oscillatable frame being transverse to the axis of said bearing means, a second spheroidal idler engaging said wheels, bearing means on which said second idler is mounted, an oscillatable frame on which said bearing means is mounted, and a frame oscillatable about an axis lying substantially in a plane including the axis of the wheels and the centers of the idlers on which frame the oscillatable supporting means associated with said first idler and the oscillatable frame associated with said second idler are mounted.

5. A claim according to claim 1, in which the element rotating with the driven shaft is the gear carrier.

6. A claim according to claim 2, in which the element rotating with the driven shaft is the gear carrier.

7. A claim according to claim 3, in which the element rotating with the driven shaft is the gear carrier.

8. A variable speed transmission comprising two coaxial friction wheels, an idler engaging said wheels, bearing means on which said idler is rotatably mounted, an oscillatable frame on which said bearing means is mounted, the axis of said oscillatable frame being transverse to the axis of said bearing means, a second idler engaging said wheels, bearing means on which said second idler is mounted, an oscillatable frame on which said bearing means is mounted, and a frame movable laterally with respect to the axis of said wheels on which frame said oscillatable frames are mounted.

9. A variable speed friction transmission comprising two coaxial friction wheels, a spherical idler engaging said wheels, bearing means on which said idler is rotatably mounted, a frame on which said bearing means are mounted, oscillatable to bring portions of said idler of different radii into engagement with said wheels to change the speed ratio, and a second frame on which said first frame is oscillatably mounted, said second frame being mounted for oscillation about an axis inclined with respect to the axis of oscillation of said first frame.

10. A variable speed transmission comprising a first shaft, a second shaft, a three-element planetary gear construction comprising (1) a first gear, (2) a second gear, and (3) a gear carrier and planetary gearing carried thereby meshing with said gears, clutch instrumentalities which in one position connect the first shaft with the second gear and the second shaft with the gear carrier and which in another position connect the first shaft with the gear carrier and the second shaft with the second gear, and centrifugal force means for controlling the operation of said clutch instrumentalities.

11. A variable speed transmission comprising a driving shaft, a driven shaft, a three-element planetary gear construction comprising a sun gear, a ring gear, a gear carrier and planetary gearing carried thereby meshing with said gears, means for holding the sun gear against rotation, and clutch instrumentalities which in one position connect the driven shaft to rotate with the gear carrier and which in another position connect the driven shaft to rotate with the ring gear, the ring gear in both positions being connected to rotate with the driving shaft.

12. A variable speed transmission comprising a driving shaft, a driven shaft, a three-element planetary gear construction comprising a sun gear, a ring gear, a gear carrier and planetary gearing carried thereby meshing with said gears, means for holding the sun gear against rotation, clutch instrumentalities which in one position connect the driven shaft to rotate with the gear carrier and which in another position connect the driven shaft to rotate with the ring gear, the ring gear in both positions being connected to rotate with the driving shaft, and centrifugal force means for controlling the operation of said clutch instrumentalities.

13. A variable speed transmission comprising a drive shaft, a driven shaft, a three-element planetary gear construction comprising a first gear, a second gear, and a gear carrier and planetary gearing carried thereby meshing with said gears, clutch instrumentalities for controlling the connection of said shafts with said planetary elements to provide three speed ratios, and two centrifugal force devices for controlling the operation of said clutch instrumentalities.

14. A variable speed transmission comprising a drive shaft, a driven shaft coaxial therewith, a friction transmission, and a planetary transmission for driving said driven shaft, said friction transmission comprising a torroidal drive wheel rotatable with the drive shaft, a torroidal driven wheel coaxial therewith, and an idler engaging said friction wheels and shiftable to engage different portions of the torroidal surfaces thereof to drive the driven friction wheel in the opposite direction from that of the drive friction wheel, said planetary gear transmission comprising a ring gear coaxial and rotatable with said drive shaft, a sun gear driven by and rotatable with said driven friction wheel, a gear carrier and planetary gearing meshing with said sun gear and ring gear, and means for disconnecting said driven shaft from driven relation with respect to said friction transmission.

15. A variable speed transmission comprising a drive shaft, a driven shaft coaxial therewith, a friction transmission, and a planetary transmission for driving said driven shaft, said friction transmission comprising a torroidal drive wheel rotatable with the drive shaft, a torroidal driven wheel coaxial therewith, and an idler engaging said friction wheels and shiftable to engage different portions of the torroidal surfaces thereof to drive the driven friction wheel in the opposite direction from that of the drive friction wheel, said planetary gear transmission comprising a ring gear coaxial and rotatable with said drive shaft, a sun gear driven by and rotatable with said driven friction wheel, a gear carrier and planetary gearing meshing with said sun gear and ring gear, means for disconnecting said driven shaft from driven relation with respect to said friction transmission and connecting it to rotate directly with said drive shaft.

WILLARD L. POLLARD.